N. RUBENSTEIN.
GRATER.
APPLICATION FILED SEPT. 14, 1916.
1,248,166.
Patented Nov. 27, 1917.
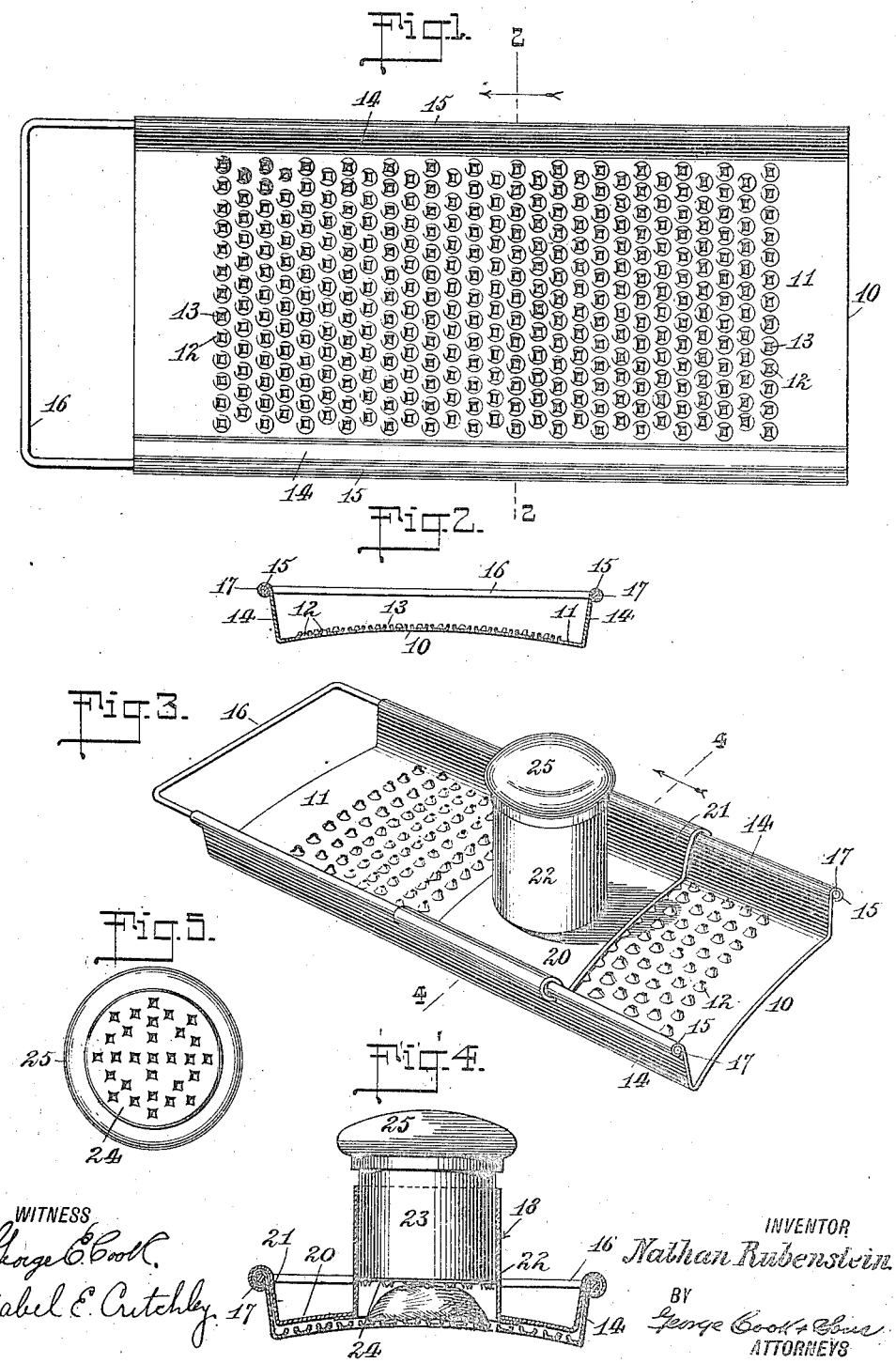
WITNESS
George E. Cook
Mabel E. Critchley
INVENTOR
Nathan Rubenstein
BY
George Cook & Sons
ATTORNEYS

UNITED STATES PATENT OFFICE.

NATHAN RUBENSTEIN, OF NEW YORK, N. Y.

GRATER.

1,248,166.  Specification of Letters Patent.  Patented Nov. 27, 1917.

Application filed September 14, 1916. Serial No. 120,005.

*To all whom it may concern:*

Be it known that I, NATHAN RUBENSTEIN, a citizen of the United States, and a resident of New York city, borough of Manhattan, in the county of New York and State of New York, have made and invented certain new and useful Improvements in Graters, of which the following is a specification.

My invention relates to a kitchen utensil and particularly to a grater, such as is used for grating potatoes, nutmeg and similar articles.

One of the objections to graters as formerly constructed, was the liability of the hand coming into contact with the sharpened serrations as the article to be grated was moved rapidly back and forth over the corrugated and serrated surface, with which the grater was provided. In my improved grater, I have provided two side walls extending above the convex, serrated and active surface of the grater, which are arranged to form a guide upon which a portion of the hand may rest, thus preventing it from accidentally contacting with the sharpened serrations of the grater. A further object is to provide a grater having side walls projecting above the convex and active surface thereof, so that the entire device may be brought into forcible contact with the edge of a table or other object and so remove the grated material from the device without liability or danger of cracking or injuring the grater, as has been the case in the present type where the convex and active surface is unprotected.

A further object is to provide a traveling carriage, which slidably engages the upstanding side walls of the device and provides for the successful grating of small objects, so that small pieces may be successfully and easily grated and reduced to a fine form with convenience and despatch.

A further object is to provide a grater which is so formed as to be strong and practically indestructible, and with the side walls thereof so reinforced as to add materially to the strength of the device, as well as forming efficient guideways for a traveling carriage, and with the reinforcing member protruding beyond one end of the grater proper, to form a convenient handle.

Other objects and advantages will appear as the description proceeds wherein it is to be understood that changes in the precise embodiment of the invention can be made within the scope of what is claimed, without departing from the spirit thereof.

The preferred embodiment of my invention is disclosed in the accompanying drawings, wherein:—

Figure 1 is a view in plan of a grater embodying the characteristic features of my invention;

Fig. 2 is a view in cross section taken on the line 2—2 of Fig. 1;

Fig. 3 is a view in perspective of my improved grater with the traveling carriage in position thereon;

Fig. 4 is a view in vertical section taken on the line 4—4 of Fig. 3;

Fig. 5 is a bottom plan view of the plunger with which the traveling carriage is provided.

Referring specifically to the several views, the grater is formed with a transversely curved body plate 10, protruding above the convex, upper surface of which, are a plurality of teeth. These teeth or serrations are preferably formed by punching openings 13 into the plate, the resulting side walls of the openings extending above the convex surface 11 of the plate and presenting jagged, sharp edges capable of grating potatoes, nutmeg and other similar articles.

The openings 13 are arranged in staggered relation, considered longitudinally of the plate, so that, as the material to be grated is drawn forcibly along the roughened serrated surface, and in the direction of the length thereof, the material will be efficiently and uniformly grated rather than the wearing away thereof in deep ridges or channels, as takes place when the serrations are arranged in longitudinal alinement. Projecting above, and formed integral with the body plate 10, are the side walls 14; the same projecting slightly outward as well as upward, and reinforcing the body plate 10, as well as forming guides, upon which the hand may rest as it is moved forcibly along the grater. These guide-walls are provided with curled upper extremities 15, presenting a smooth external surface upon which the hand may rest and move. A handle 16, preferably formed of wire and U-shaped, has the legs 17 contained within the rounded or curled portions 15 of the side walls and reinforces the same. The connected extremities of the legs 17 form an efficient handle, by means of which the entire grater may be conveniently manipulated during use, and, at the same time, form a convenient loop for the securement of the grater to a hook or other support when not in use.

Such grated material as is deposited upon the serrated and convexed surface of the body plate 10 may be removed therefrom, and the grater cleaned, by bringing the side walls of the grater into forcible contact with a table or other article; the same being accomplished without danger of breaking or distorting the device, as the reinforced upper and curled extremities of the side walls form admirable bumpers.

In order that ends of material may be grated, which would otherwise be discarded as being too small to hold and successfully grate, I provide a traveling carriage 18, which includes a curved transverse plate 20 and upstanding side walls 21. The upstanding side walls 21 are formed for engagement with the curled extremities 15 of the side walls. The plate 20 is curved to correspond to the curvature of the body plate 10 of the device, and the carriage may be removed from the grater by moving it beyond the lower or outermost extremity thereof, this being necessary when it is desired to use the grater without the traveling carriage, and in order that it may be efficiently cleaned and the grated material removed. A container 22 is carried by the plate 20 and is formed as an open receptacle, the opened end of which extends down through the plate 20. In order that the material to be grated, which is deposited within the container 22, may be forcibly pressed against the serrated surface of the plate 10, a plunger 23 is provided, the lower surface of which is provided with a serrated plate 24, holding the small particles within the container against movement therein, and thus rendering the grating thereof more efficient. The upper extremity of the plunger is provided with a finger-engageable knob 25; the entire device, presenting a neat and pleasing appearance, and being simple and rugged in construction and easily maintained in a sanitary condition, forms an efficient and desirable utensil.

What I claim is:—

A grater comprising a transversely curved plate with teeth projecting above the convex surface thereof, outwardly flared side walls carried by said plate and projecting above the convex surface thereof and provided with rolled extremities, a handle formed as a U-shape wire loop with the legs thereof fitting within the rolled extremities of the said side walls, a sliding carriage with a convex base plate and outwardly flared upstanding side walls having curled edges slidably and detachably engaging the rolled edges of the side walls of the grater, and means carried by the said carriage for receiving an article therein and for pressing it against the projecting teeth of the plate of the grater.

Signed at New York, borough of Manhattan, in the county of New York, and State of New York, this 13" day of September A. D. 1916.

NATHAN RUBENSTEIN.

Witnesses:
ANNA V. WALSH,
MABEL E. CRITCHLEY.

Copies of this patent may be obtained for five cents each, by addressing the "Commissioner of Patents, Washington, D. C."